United States Patent
Cucinotta et al.

(10) Patent No.: US 10,237,057 B2
(45) Date of Patent: Mar. 19, 2019

(54) METHOD AND SYSTEM FOR CONTROLLING THE EXCHANGE OF PRIVACY-SENSITIVE INFORMATION

(71) Applicant: Alcatel Lucent, Boulogne Billancourt (FR)

(72) Inventors: Tommaso Cucinotta, Dublin (IE); Stephane Betge-Brezetz, Nozay (FR)

(73) Assignee: Alcatel Lucent, Boulogne Billancourt (FR)

( * ) Notice: Subject to any disclaimer, the term of this patent is extended or adjusted under 35 U.S.C. 154(b) by 94 days.

(21) Appl. No.: 14/903,695

(22) PCT Filed: Aug. 18, 2014

(86) PCT No.: PCT/EP2014/002263
§ 371 (c)(1),
(2) Date: Jan. 8, 2016

(87) PCT Pub. No.: WO2015/036087
PCT Pub. Date: Mar. 19, 2015

(65) Prior Publication Data
US 2016/0182221 A1    Jun. 23, 2016

(30) Foreign Application Priority Data
Sep. 13, 2013   (EP) .................................. 13360029

(51) Int. Cl.
*H04L 29/06* (2006.01)
*H04L 9/00* (2006.01)
*H04L 9/14* (2006.01)

(52) U.S. Cl.
CPC ................ *H04L 9/006* (2013.01); *H04L 9/14* (2013.01); *H04L 63/0428* (2013.01);
(Continued)

(58) Field of Classification Search
CPC ......... H04L 9/006; H04L 9/14; H04L 9/3247; H04L 9/3263; H04L 63/0435; H04L 63/083; H04L 63/10; G06F 21/10
(Continued)

(56) References Cited

U.S. PATENT DOCUMENTS 6,694,431 B1 * 2/2004 Binding .............. H04L 63/0428
713/152
7,607,164 B2 * 10/2009 Vasishth ............... G06F 21/577
709/223
(Continued)

FOREIGN PATENT DOCUMENTS

EP    1705941    9/2006
EP    1862948    12/2007
(Continued)

*Primary Examiner* — Syed A Zaidi
(74) *Attorney, Agent, or Firm* — McCracken & Gillen LLC

(57) ABSTRACT

A method for controlling the exchange of private data, associated with a client device, between an application in execution on or for the device and a serving node in a data network, comprising transmitting a request to the serving node from the application for access to a service requiring use of the private data, receiving challenge data at the application from the serving node, requesting authorization for the use of the private data using a secure user interface of the client device to a trusted information manager on the basis of the challenge data, transmitting an obfuscated version of the private data for use with the service from the trusted information manager to the application on the basis of the authorization.

10 Claims, 2 Drawing Sheets

(52) U.S. Cl.
CPC .......... *H04L 63/0853* (2013.01); *H04L 63/10* (2013.01); *H04L 63/0815* (2013.01)

(58) Field of Classification Search
USPC ........................................................ 713/153
See application file for complete search history.

(56) References Cited

U.S. PATENT DOCUMENTS

| | | |
|---|---|---|
| 2002/0169966 A1 | 11/2002 | Nyman et al. |
| 2005/0135388 A1 | 6/2005 | Hartikainen et al. |
| 2007/0028098 A1* | 2/2007 | Baartman ............. G06F 9/5072 713/162 |
| 2010/0037050 A1* | 2/2010 | Karul ................. H04L 63/0428 713/167 |
| 2010/0122082 A1 | 5/2010 | Deng et al. |
| 2010/0313019 A1* | 12/2010 | Joubert ................ G06F 21/313 713/168 |
| 2014/0236842 A1* | 8/2014 | Salminen .............. G06Q 20/20 705/75 |

FOREIGN PATENT DOCUMENTS

| | | |
|---|---|---|
| JP | 2011507060 | 3/2011 |
| WO | 02/19593 | 3/2002 |

\* cited by examiner

METHOD AND SYSTEM FOR CONTROLLING THE EXCHANGE OF PRIVACY-SENSITIVE INFORMATION

TECHNICAL FIELD

The invention relates generally to the exchange of privacy sensitive information, and more particularly to such exchanges in distributed computing environments.

BACKGROUND

The Information and Communications Technology (ICT) panorama is evolving towards more and more distributed computing paradigms in which it is typical for data, content and applications to be managed, stored and accessed in the cloud. There is an increasing use of virtual desktop and other types of remotely managed virtualized IT appliances, and an increasing use of applications designed according to a distributed computing paradigm that rely on continuous connectivity, and that are able to interact with a plethora of other on-line services and data sources.

The separation between local services and applications in execution on a client device, and those that are being provided from a remote location is becoming increasingly blurred, and the prominence of web-based technologies and visual similarities between the design of web-based applications and notional 'local' ones has increased the potential for confusion, and can sometimes leave a user with the puzzling doubt about whether the actions he or she is doing are actually happening locally, or whether everything is happening "on the web", or "in the cloud."

While this new computing panorama enables new and more collaborative computing scenarios, at the same time it can constitute a threat to users' privacy, particularly whenever the boundary between local and distributed computing becomes fuzzy and confusing. For example, it is becoming increasingly challenging to distinguish whether sensitive information, such as e-mail access credentials (username and password for example) is being delivered to the local computing device, or it is being delivered to some on-line 3rd-party service that will use such information on behalf of the user.

Therefore, in the new and emerging computing panorama, trusted and trustable mechanisms designed to protect users' privacy and privacy-sensitive information, such as access credentials and passwords, but also the whole set of privacy-sensitive information a user is used to collect and have available in the private context of his or her own device is desirable.

SUMMARY

According to an example, there is provided a method for controlling the exchange of private data, associated with a client device, between an application in execution on or for the device and a serving node in a data network, comprising transmitting a request to the serving node from the application for access to a service requiring use of the private data, receiving challenge data at the application from the serving node, requesting authorisation for the use of the private data using a secure user interface of the client device to a trusted information manager on the basis of the challenge data, transmitting an obfuscated version of the private data for use with the service from the trusted information manager to the application on the basis of the authorisation such that the application cannot gain knowledge of the private data.

The challenge data can include a cryptographically secure random number or a public key or a sequence number. The obfuscated version of the private data can include a cryptographic hash or encrypted version of the private data. The obfuscated version of the private data can be generated in combination with the cryptographically secure random number or public key or sequence number. The trusted information manager can be operationally isolated from the application. The challenge data can be transmitted from the application to the trusted information manager in combination with a identifier for the service and/or intended operation to be performed on the service and/or the application.

According to an example, there is provided a method for preventing direct access to private data associated with a client device by an application in program execution on or for the device, comprising using a trusted information manager of the device to provide an obfuscated version of the private data to the application on the basis of a request from a remote service and for use between the application and the remote service.

Each interaction between the device and the trusted information manager can require user authorisation.

According to an example, there is provided a system for controlling the exchange of private data, associated with a client device, between an application in execution on or for the device and a serving node in a data network operable to receive a request from the application for access to a service requiring use of the private data, and to transmit challenge data to the application, comprising a secure user interface of the client device to receive a request for authorisation for the use of the private data on the basis of the challenge data, a trusted information manager to transmit an obfuscated version of the private data for use with the service to the application on the basis of the authorisation. The trusted information manager can be operationally isolated from the application. The trusted information manager can receive challenge data transmitted from the application in combination with a identifier for the service and/or intended operation to be performed on the service and/or the application.

According to an example, there is provided a trusted information manager to transmit an obfuscated version of private data to an untrusted application in program execution on or for a device with which the private data is associated, on the basis of a request from a remote service sent to the untrusted application for use of the private data, the obfuscated version being for use between the untrusted application and the remote service whereby the untrusted application cannot gain knowledge of the private data.

According to an example, there is provided a computer program product, comprising a computer usable medium having computer readable program code embodied therein, said computer readable program code adapted to be executed to implement a method for controlling the exchange of private data, associated with a client device, between an application in execution on or for the device and a serving node in a data network as provided above.

BRIEF DESCRIPTION OF THE DRAWINGS

Embodiments will now be described, by way of example only, with reference to the accompanying drawings, in which.

DETAILED DESCRIPTION

Figure 1:
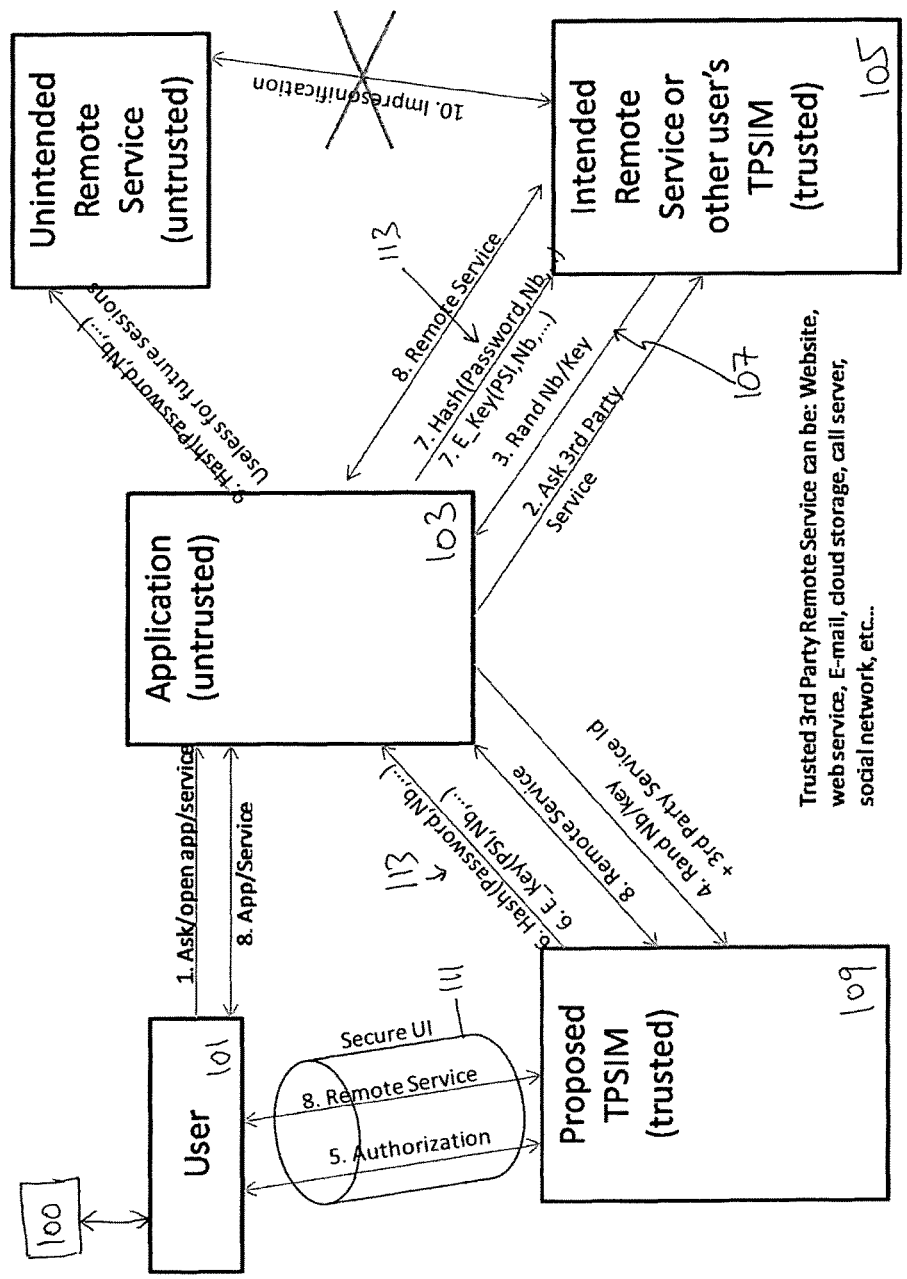
FIG. 1 is a schematic representation of a method for controlling the exchange of private data, associated with a client device, between an application in execution on or for the device and a serving node in a data network according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

An application, such as a browser or e-mail client for example, that is in program execution on or for a client device, is normally trusted to allow a user to correctly access a remote service. However, at the same time it may either voluntarily/maliciously (e.g., free application embedding spying logic), or non-voluntarily (e.g., system simply infected by malware), disclose privacy-sensitive information to remote parties.

According to an example, a trusted entity offers a secure channel to a client GUI, and is used to provide privacy-sensitive information for a requesting service via an application such that the application is not able to see in clear-text the information itself.

According to an example, a trusted information manager manages a users' privacy-sensitive information, including access credentials, credit-card numbers, phone and address book entries, and so on without disclosing such information to a requesting application, be it a regular local or a remote application, such as one that is executed at a remote server in the cloud for example.

A user can interact with a remote service via a local application (or, it can be a remote application with local GUI components close to the user for example). The application is typically trusted by the user for the purposes of interacting with the remote service, but at the same time it may be untrusted from the user's perspective for matters related to ensuring the user's privacy. That is, the untrusted application can disclose to (non-explicitly authorized) remote (unintended and/or untrusted) services private information that it is handling on behalf of the user (e.g., e-mail access credentials, phone numbers, addresses and e-mail addresses, etc. . . . ), without the user realizing or detecting, nor having had any possibility to approve or agree to the disclosure.

A trusted information manager (TIM) is a trusted component whose responsibility is to manage and, when required, provide privacy-sensitive information in the context of secure PSI exchange protocols run by other, possibly untrusted, components and applications running on a local device, when interacting, on behalf of the user, with a remote (trusted) service. The trusted information manager may be adapted to receive private data from an application, process the private data to generate an obfuscated version of the private data (e.g., generate a cryptographic hash or encrypted version of the private data), and transmit the obfuscated version of the private data to the application. The trusted information manager may transmit the obfuscated version of the private data to the application for a device with which the private data is associated based on a request from a remote service sent to the application for use of the private data. The obfuscated version is for use between the application, which may be untrusted, and the remote service whereby the application cannot gain knowledge of the private data.

FIG. 1 is a schematic representation of a method for controlling the exchange of private data, associated with a client device, between an application in execution on or for the device and a serving node in a data network according to an example.

A user 101 opens a local application (app) 103, which then contacts an intended (trusted) remote/cloud service 105. The remote service 105 sends to the app 103 challenge data 107 in the form of unique material to be used for secure transfer of information back and forth among the users' device 100 and the remote service itself. For example, this can be a cryptographically secure randomly generated number, to be used for preventing replay attacks by possible malicious attackers, or it can be a public-key (or equivalently a public-key certificate), to be used for confidential exchange of further key(s) or directly of sensitive information.

The app 103 forwards the received material 107 to the TIM 109, which requests user authorization to use the (specified portion of the) sensitive information/data for the intended use, and with interaction with the intended remote service. In an example, user 101 interacts with the TIM through a secure UI or GUI 111, checks the information and approves or stops the whole process.

TIM 109 gives back the local (possibly untrusted) app 103 a processed version 113 of the required sensitive information that preserves its privacy and confidentiality for use only by the intended final recipient(s); for example, in case of a simple password, the TIM does not disclose the password, but rather it provides its version processed using the additional material (random number/nonces, session IDs, encryption key—in such case a key verification is needed, e.g., through standard PKI provided by the remote service for example). The processed version is obfuscated private data for use with the service, and which is transmitted from the trusted information manager to the application on the basis of an authorisation provided by a user of the device in response to a request for authorisation of the use of the user's private data.

The app 103 forwards to the remote service 105 the information 113 from the TIM, along with additional required information if desired; note that, the app 103, in general, cannot gain knowledge of the privacy-sensitive information/data 113 that is being exchanged between the TIM 109 and the remote service 105.

The user 101 uses the remote service 105 through a local app 103 user interface for example, possibly recurring to the secure UI 111 whenever it might need to perform special actions on PSI data; for example, changing/renewing the remote service password would require such a direct user interaction with TIM 109; displaying, modifying, updating an address book entry would require such an interaction through the secure UI 111 and so on.

The functions performed by the various parties participating in a protocol as described with reference to FIG. 1 are also highlighted in FIG. 2, which is a further schematic representation of a method for controlling the exchange of private data, associated with a client device, between an application in execution on or for the device and a serving node in a data network according to an example.

Figure 2:
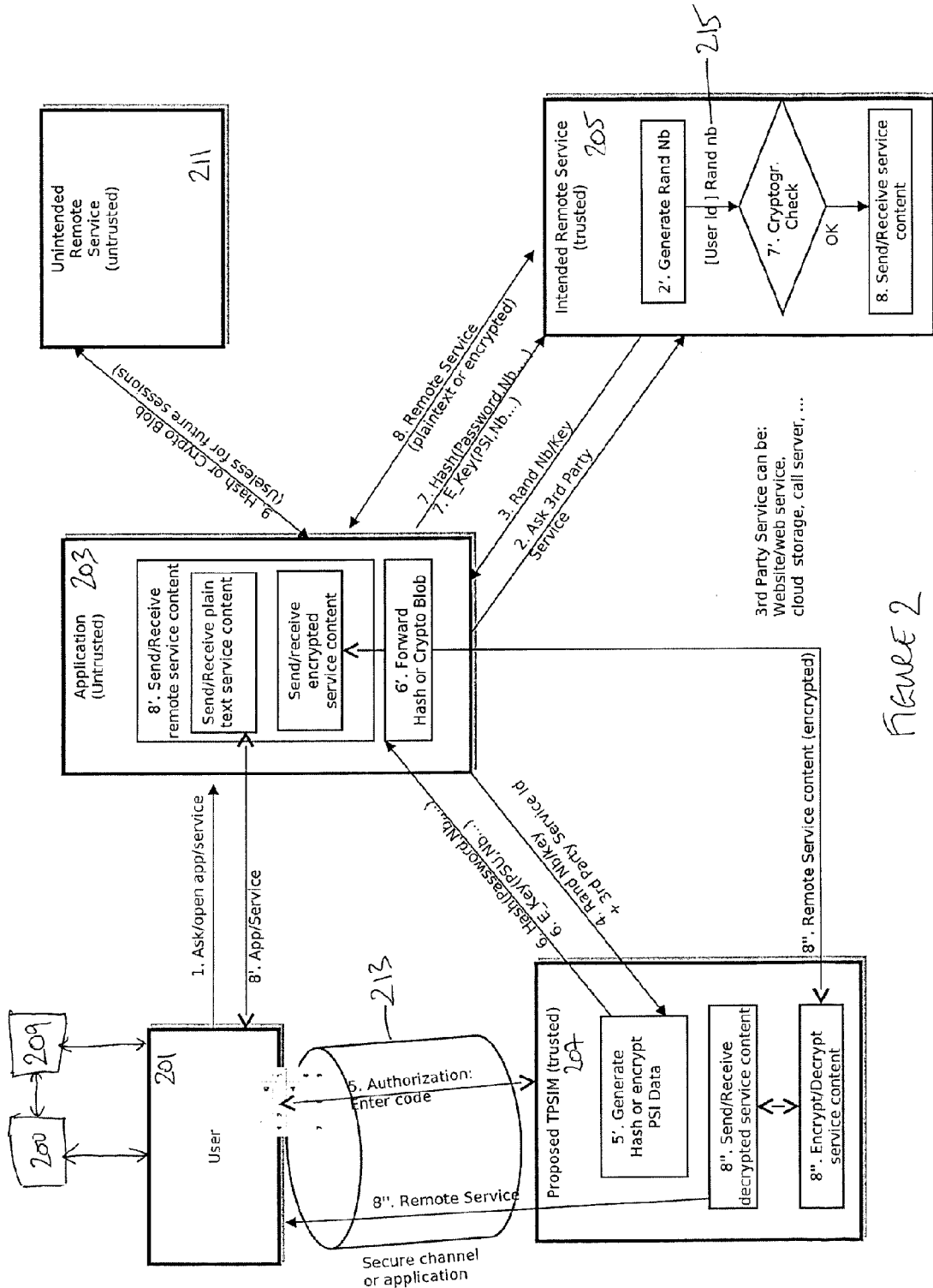
FIG. 2 is a further schematic representation of a method for controlling the exchange of private data, associated with a client device, between an application in execution on or for the device and a serving node in a data network according to an example.

With reference to FIG. 2, a user 201 interacts with a client device 200 for the purpose of using an application 203 that utilises a remote service 205 executing on or as a serving node as part of a data network (not shown) such as the internet or a cloud-based network for example. The application 203 can be executed on the client device 201 using typical components thereof such as a memory and processing unit and so on, or it be executed remotely for the client device such that the user 201 interacts with the application 203 using an interface on the device 200 associated with or geared for use with the application 203. For example, application 203 can be executed on a server that is remote from the device 200, and the device can include a user interface to enable the user the user 201 to interact with the application 203.

A trusted information manager 207 is provided for or as part of the device 200. For example, manager 207 can be a hardware or software module within device 200 that is isolated from rest of the system, and particularly from application 203. It can be isolated using a number of technologies such as software-only, standard OS-level protection and isolation, to hardware-assisted isolation such as trusted boot isolation and so on. The trusted information manager 207 prevents direct access to private data associated with the client device 200 (and potentially by association with the user 201) by the application 203 in program execution on or for the device 200 by providing an obfuscated version of the private data 209 to the application 203 on the basis of a request from the remote service 205 and for use between the application and the remote service. An unintended remote service 211 that may be linked to the application 203 will thus not be able to use the private data 209.

A secure user interface 213 between the trusted information manager 207 and the user 201 is used for a request for user 201 for authorization to be able to use the private data 209 with the application 203 for the intended remote serving node 205. The secure UI 213 can be incorporated into the user's device 200 design, so that the user 201 cannot mistakenly consider an untrusted interaction for a trusted one.

User 201 opens application 203 or service 205 at step 1. Application 203 requests access to the service 205 in step 2. At 2' a random number 215 is generated which can include a user ID associated with the device 200 and/or user 201. This is passed to application 203 at 3. Application 203 augments this data with a service 205 ID and the combination is passed to TIM 207 at 4. At 5, authorisation is requested from user 201 to use private data 209 using the UI 213. A passcode, password or some other form of suitable authorisation can be provided, including for example a biometric authorisation.

At 5', a hashed or encrypted version of the data 209 is generated, and this is passed to application 203 at 6. At 6', the hashed or encrypted version of the data 209 is passed (7) from application 203 to service 205, and the data is checked at 7' by the service 205 to determine its authenticity. If the data has been tampered with or is otherwise not as expected the process can end. Otherwise, service 205 transmits service content data at 8 to application 203 for use by the application, and transmitted to and from user 201, device 200 and application 203 at 8'.

The method provides that there is no direct interaction of the user with a local app that may compromise the security and confidentiality of privacy-sensitive data.

Note that, as each interaction with the TIM would require the user's authorization according to an example, exploiting the trusted GUI element, then attacks in which the potentially untrusted component/application would try to behave as a gateway between the remote untrusted remote service, e.g., willing to authenticate to the legitimate user's remote service as the user, by exploiting the functionality of the TIM, would not be possible. Indeed, the user would detect immediately that they were being asked to authorize use of a PSI while they were not using the remote service.

In an example, the TIM is isolated from the other untrusted applications running on the same device. This can be achieved using typical OS-level protection and isolation means in the simplest cases, or using trusted hardware in the most privacy-demanding cases.

According to an example, a system as described can be realized as a set of software components and APIs for application developers, to be made available within a mobile platform OS. For example, the TIM can be realized as a component within an OS. A secure UI interaction with the user, in a mobile platform, can be provided by having the TIM as an integral part of a GUI sub-system within the platform, and having a special interaction with the user, such as pressing a special "trusted" button of the device, or turning on a special "trusted" LED on the device notifying that a trusted interaction is happening for example, during which only visualization of trusted GUI elements would be allowed, such as the TIM. For example, requesting user authorisation for the use of a specific password for a specific on-line service, and/or asking a user to provide a PIN or password or passphrase needed to decrypt a password database, and so on. The interaction and physical design can be such that a malicious component/application cannot emulate the trusted interaction and the trusted GUI of the TIM. Such an interaction, for example, might persuade the user to change the password for an on-line service, but the user would deliver the new password to the malicious component, rather than to the TIM. However, coupling the TIM with some trusted interaction model can be sufficient to prevent this kind of attack. A secure user interface can be implemented using the Trusted Execution Environment (TEE) standard from Global Platform for example.

The trusted information manager is isolated from the rest of the system, and particularly from the application requesting the privacy-sensitive information. A number of technologies can be leveraged for realizing such an isolation, ranging from software-only standard OS-level protection and isolation, to hardware-assisted isolation such as trusted boot and the TEE specification mentioned above.

Therefore, according to an example, there is provided a method and system for controlling the exchange of private data, associated with a client device, between an application in execution on or for the device and a serving node in a data network. That is, a method and system for managing users' privacy-sensitive information for (either local or remote) services in a way that confines knowledge of the PSI data (such as passwords, phone book entries, etc. . . . ) within the boundaries of a trusted component, namely the TIM. As the latter is able to process the PSI data as required within the context of the required data exchange protocols, the PSI data is never revealed to the outside world, including both possible malicious software applications or components additionally installed onto the local device, and the main application itself, that is used by the user to interact with the legitimate/intended remote service. This ensures the impossibility for a malicious 3rd party entity to obtain a copy of the sensitive data, and use it in future interactions without the user's authorization. For example, the proposed mechanism can be used to ensure that a <username, password> pair used to access an on-line e-mail system is only known to the local device, and is never transmitted to untrusted 3rd parties, regardless of whether the application is used or executed locally within the device to access the remote e-mail (i.e., in the example, the e-mail client can never see the password in clear text).

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for controlling an exchange of private data, associated with a client device, between an application in execution on or for the client device and a serving node in a data network, comprising:
   transmitting a request to the serving node from the application for access to a service requiring use of the private data;
   receiving challenge data at the application from the serving node;
   requesting authorisation for the use of the private data using a secure user interface of the client device to a trusted information manager based on the challenge data;
   receiving, at the application, an obfuscated version of the private data generated at the trusted information manager; and
   transmitting the obfuscated version of the private data for use with the service from the trusted information manager to the serving node via the application based on the authorisation, such that the application cannot gain knowledge of the private data.

2. The method of claim 1, wherein the challenge data includes a cryptographically secure random number or a public key or a sequence number.

3. The method of claim 1, wherein the obfuscated version of the private data includes a cryptographic hash or encrypted version of the private data.

4. The method of claim 3, wherein the obfuscated version of the private data is generated in combination with the challenge data.

5. The method of claim 1, wherein the trusted information manager is operationally isolated from the application.

6. The method of claim 1, wherein the challenge data is transmitted from the application to the trusted information manager in combination with an identifier for the service and/or intended operation to be performed on the service and/or the application.

7. The method of claim 1, wherein each interaction between the client device and the trusted information manager requires user authorisation.

8. The method of claim 1, wherein the authorisation comprises a passcode, a password or a biometric authorisation.

9. The method of claim 1, wherein the data network is a cloud-based network or an Internet network.

10. A non-transitory computer readable medium storing computer executable instructions for performing steps, comprising:
   transmitting a request to the serving node from the application for access to a service requiring use of the private data;
   receiving challenge data at the application from the serving node;
   requesting authorisation for the use of the private data using a secure user interface of the client device to a trusted information manager based on the challenge data;
   receiving, at the application, an obfuscated version of the private data generated at the trusted information manager; and
   transmitting the obfuscated version of the private data for use with the service from the trusted information manager to the serving node via the application based on the authorisation, such that the application cannot gain knowledge of the private data.

* * * * *